E. Hawks.

Cooking Stove.

No. 3,585. Reissued Aug. 3, 1869.

Witnesses

Charles D. Ellis

Marcus P. Norton

Inventor

Elizabeth Hawks

United States Patent Office.

ELIZABETH HAWKS, OF TROY, NEW YORK.

*Letters Patent No.* 64,102, *dated April* 23, 1867; *reissue No.* 3,585, *dated August* 3, 1869.

IMPROVEMENT IN AUXILIARY AIR-CHAMBER FOR STOVES, HEATERS, AND FURNACES.

The Schedule referred to in these Letters Patent and making part of the same.

*To all whom it may concern:*

Be it known that I, ELIZABETH HAWKS, of the city of Troy, in the county of Rensselaer, and State of New York, have invented an Auxiliary Air-Chamber for Stoves, Heaters, and Furnaces of all descriptions; and that the following is a full, clear, and exact description of the same, reference being had to the accompanying drawings, which form and make a part of this, my specification.

Like letters represent and refer to like or corresponding parts.

The invention, as illustrated by the drawings, consists of an oblong rectangular, or other-shaped cap or cover, open on the bottom and side presented to the fire-grate.

The front or outer side has a slot, B, of convenient length, through which the draught is admitted to supply the fire.

This slot may also be used for the admission of a raker for the purpose of cleaning the grate of ashes, &c., whenever the same is clogged thereby.

Figure 2:
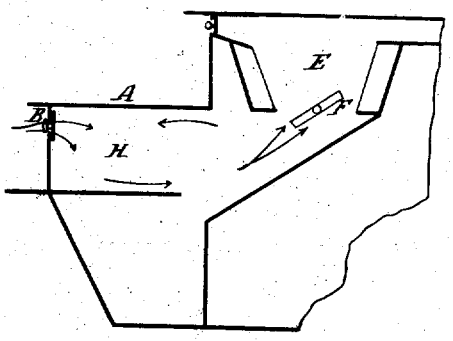
Figure 2 is a sectional view, showing the fire-box, ash-pit, and the auxiliary air-chamber, arranged above the hearth of the stove.

The cover or chamber A, when applied to or constructed with a stove, heater, or furnace, as the case may be, is so fitted as to preclude the admission of any draught, except through the heated chamber H, fig. 2.

By this means, a large air-chamber, or space, is made, through which the air must pass before it reaches the fire.

During such passage it becomes highly heated and rarefied, thereby securing a diminished consumption of fuel, and also furnishing a largely-increased radiating-surface.

Figure 3:
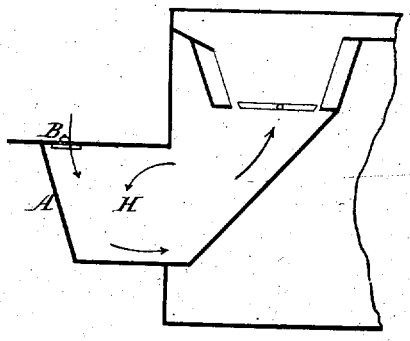
Figure 3 is also a sectional view, showing the fire-box, ash-pit, and auxiliary air-chamber below the hearth of a cooking-stove, and which auxiliary air-chamber is more fully hereinafter described and set forth.

Another valuable feature of my invention, and one which recommends it to every housekeeper in the country, is the fact, that applying this chamber and guard, as it might very appropriately be designated, no dust or ashes are thrown into the room while the grate is being dumped or raked, but, on the contrary, the dust, smoke, ashes, and cinders, are all confined within the chamber H, figs. 2 and 3, and all trouble or annoyance on account of the same is avoided.

Experiment has further demonstrated that when this chamber is applied as above, a much higher temperature of the lower strata of the atmosphere in the room is obtained, thereby securing a more equable temperature, with a small amount of fuel, through all parts of the room.

Among the other advantages secured by this device are—

First, a more perfect consumption of the gases and vapors generated by combustion, actual trial having demonstrated, that when communication with the chimney or escape-flue is entirely cut off, no escape of any noxious gases or vapors is observable, thereby showing a very nearly perfect consumption of the fuel and gases.

Second, when applied to, or constructed with, cook-stoves of ordinary patterns, the plate covering the hearth, and also a part of the front of the stove may be dispensed with, thus obtaining a much larger radiating-surface on the bottom of the stove, by means of which the temperature of the lower part of the room is rendered more uniform.

This device may be cast with stoves and heaters in the same manner as reservoirs or other external or internal appendages may be attached.

If cast in a separate piece or pieces, it may be attached to the grate or ash-pit chambers by means of bolts passing perpendicularly through the chamber H and hearth-plate, and secured in the ordinary manner; or the patterns for the stove, range, or heater may be so constructed as to form an internal chamber exposed to the heat generated in the fire-box, so that no draught can reach the fuel, except by first passing through this chamber.

It may be constructed either on the sides of the fire-box, admitting the draught at one end of the chamber, and during its passage through the same, rarefying it and passing it into the grate at the opposite end, or by constructing said chamber immediately under the grate or fire-box, so that the draught cannot reach the fire until after having passed through this chamber.

The construction and application of this device and principle, must necessarily be as various as there are different kinds of stoves and heaters used.

Figure 1:
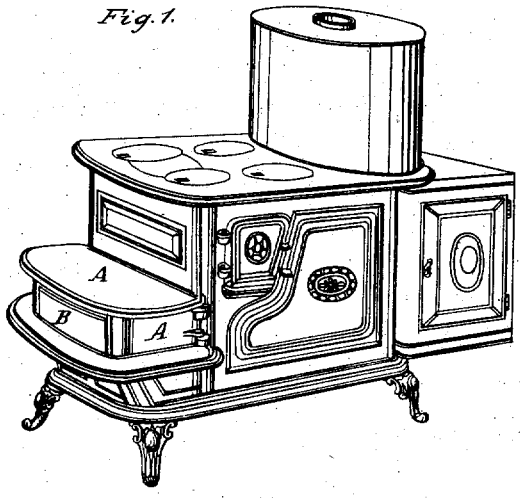
Figure 1 is a perspective view of a cooking-stove containing my invention herein described and set forth.

The form, construction, attachment, combination, and application of this device, as shown by the drawings, at figs. 1, 2, and 3, are but two of many involving the same principles.

By modifications in form and shape, this invention may be adapted to all classes of heaters, furnaces, and boilers where it is deemed advisable to supply the fire with a heated draught, or when the floating dust or ashes are a nuisance incident to the agitation or cleaning of the grate.

Having thus described the nature, construction, and operation of my said invention,

What I claim, and desire to secure by Letters Patent of the United States, is—

1. The shield A, or any equivalent therefor, containing a horizontal opening or slot *b* at or near the top or upper edge thereof, constructed and applied, or used in the manner and for the purposes substantially as herein described and set forth.

2. Also, the employment of the auxiliary air-chamber H, constructed, arranged, and operated in combination with the fire-grate F, and fire-chamber or chamber of combustion E, in the manner substantially as hereinbefore described and set forth.

3. Also, the arrangement and combination of the opening or elongated slot B, or any equivalent thereof, with the auxiliary air-chamber H, by means of which atmospheric air is admitted to the fire in the combustion-chamber E, so as to promote and facilitate combustion and economy in the use of fuel, substantially as hereinbefore described and set forth.

In testimony whereof, I have hereunto set my hand, this 30th day of January, A. D. 1869.

ELIZABETH HAWKS.

Witnesses:

CHARLES D. KELLUM,
MARCUS P. NORTON.